United States Patent [19]

Prodel

[11] 4,008,512
[45] Feb. 22, 1977

[54] BAND CLAMP OF PLASTICS MATERIAL

[75] Inventor: Marcel Prodel, Arnac Pompadour, France

[73] Assignee: Societe anonyme dite: Mecanoser S.A., Arnac-Pompadour, France

[22] Filed: July 9, 1975

[21] Appl. No.: 594,304

[30] Foreign Application Priority Data

July 17, 1974 France .................. 74.24885
Mar. 26, 1975 France .................. 75.09541

[52] U.S. Cl. .................................. 24/16 PB
[51] Int. Cl.² ................................ B65D 63/00
[58] Field of Search ........... 40/21 C; 248/74 PB; 24/73 PB, 16 PB, 206 A, 30.5 P, 230 B, 248 SL, 249 SL, 255 SL

[56] References Cited

UNITED STATES PATENTS

| | | | |
|---|---|---|---|
| 3,214,808 | 11/1965 | Litwin | 24/16 PB |
| 3,581,347 | 6/1971 | Verspieren | 24/16 PB |
| 3,708,835 | 1/1973 | Bienz | 24/16 PB |
| 3,747,164 | 7/1973 | Fortsch | 24/16 PB |
| 3,755,859 | 9/1973 | Solari | 24/16 PB |
| 3,842,688 | 10/1974 | Baginski | 24/16 PB X |

FOREIGN PATENTS OR APPLICATIONS

| | | | |
|---|---|---|---|
| 1,251,076 | 12/1960 | France | 24/206 A |
| 508,037 | 1/1955 | Italy | 24/206 A |

*Primary Examiner*—Paul R. Gilliam
*Attorney, Agent, or Firm*—Brumbaugh, Graves, Donohue & Raymond

[57] ABSTRACT

A band clamp of plastics material comprises a strap, with transversely extending teeth, integral with a toothed flap extending perpendicularly to the strap and connected thereto by a hinge portion of reduced cross-section. When the strap has been formed into a band with its remote end superimposed on the end to which the flap is attached, the flap is turned back to bring its teeth into engagement with those of the strap and is held in this position by co-operating coupling means on the strap and flap.

4 Claims, 8 Drawing Figures

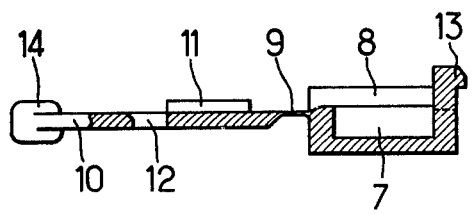
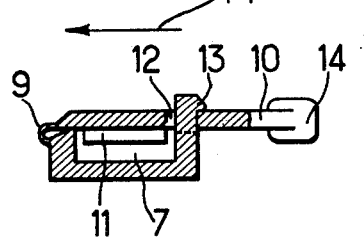
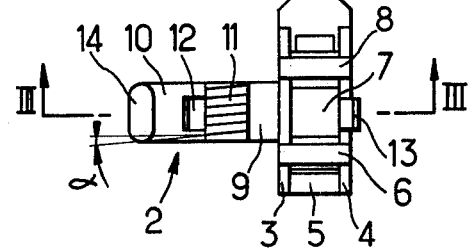

BAND CLAMP OF PLASTICS MATERIAL

Most toothed clamping bands of plastic material are known to have disadvantages, namely that these bands cannot be released, for example when an error has been made in the determination of conductor cables to be grouped, without destroying them. Manufacturers of plastics toothed bands have endeavoured for a long time to make releasable bands.

Some such bands have been made in a single piece but to release them generally requires the use of a tool permitting the deformation of the relatively rigid part of the buckle of these bands, provided to co-operate with the teeth of the strap in these bands, so as to release this strap.

In addition, such single-piece releasable bands generally have the disadvantage of a buckle the thickness of which is substantially greater than that of buckles of band clamps of the known non-releasable kind, and additionally have a form which is more difficult to make by a moulding technique.

Other releasable band clamps comprise an independent detachable element, which ensures the retention of the strap by means of at least one tooth or edge capable of co-operating with the teeth of the strap, this independent element being generally capable of being deformed without the use of a tool.

Unfortunately the cost price of such two-piece band clamps is inevitably higher than that of band clamps made in a single piece.

In addition, it may be observed that the deformation permitting the release of the abovementioned band clamps is always obtained, in the known releasable band clamps, by exerting a force in the plane of these band clamps.

A one-piece releasable plastics band clamp according to the present invention comprises a strap having transversely extending teeth, lateral upwardly projecting elements formed on a first end portion of the strap for locating the sides of the opposite end portion of the strap when the latter end portion is superimposed on the first end portion to form a band, a flap extending perpendicularly to the direction of the length of the strap and attached to the said first end portion of the strap by a flexible portion of reduced cross-section permitting the flap to be turned back at the portion of reduced cross-section to lie over the strap, the flap having teeth which, when the flap has been turned back, extend parallel to and engage the teeth of the said superimposed portion of the strap, the said first end portion of the strap and the flap being formed with co-operating coupling devices for locking the flap in its turned-back position and thereby maintaining the engagement of the teeth of the flap and strap.

Preferably, the strap is formed with a catch and the flap is formed with an aperture in a position such that the catch can be passed through the aperture to lock the flap in its turned-back position.

In the preferred form of band clamp embodying the invention, the said first end portion of the strap is provided with two bars formed with openings for the passage of the strap; these bars have for effect, in addition to their role in guiding the strap, to participate in opposing the release of the toothed engagement by their wedging of the toothed strap. The opposite end of the band clamp may be put in place with the flap open, which greatly facilitates this operation, the closure of the flap taking place only when the desired degree of tightening has been achieved.

The band clamp will not release, even in the presence of a strong pulling force, because to disengage the teeth a movement must take place perpendicularly to the direction of the stress.

The flap overlaps the strap sufficiently to permit it to be easily gripped for unbuttoning.

In this preferred form, the teeth of the strap and of the flap can be inclined, with respect to the transverse direction of the strap, through a few degrees or a fraction of a degree, in such a manner as to use a part of the force tending to release the strap to reinforce the locking of the apertured flap under an undercut portion of the catch.

Most of the releasable toothed band clamps hitherto proposed, whether in one part or in two parts, have a retaining buckle for the toothed strap which has one or two passages or openings of which the plane of symmetry, in the width of the opening, is perpendicular to the general plane of the toothed strap; as a result, such a buckle, when the band clamp is in place on the bundle of cables which it holds, constitutes a protruberance which is unpleasing to the eye and is sometimes awkward.

In the band clamp described above, on the other hand, the release is effected easily by pulling the apertured flap off the catch and the closure buckle has openings for the passage of the strap of which the plane of symmetry is parallel to that of the strap. This greatly facilitates fastening and unfastening. In addition, the avoidance of a separate clamping member, and the manner of unclamping by a transverse pivotal movement of 180°, have permitted the applicants to make a band clamp having a buckle which is of relatively small thickness and which can be easily moulded.

In one form of band clamp embodying the invention, there is no apertured cross member at the said first end portion of the strap where the opposite end of the strap passes through the coupling portion. It was found that when the teeth are slightly sloped in the appropriate direction with respect to the transverse direction of the strap, the provision of this cross member at the leading end of the buckle was unnecessary. This permits a certain economy of material by reducing the length of the closure buckle. If desired, an economy in material can also be achieved by replacing at least one of the cross members by two lugs extending inwardly from the sides of the strap, forming retaining lugs which pass over the opposite end portion of the strap in the operational form of the clamp. As these lugs are not joined, they are capable of being pushed apart when a pressure is exerted on them by means of the toothed strap. Consequently, it is possible to insert the free end of the strap without sliding it between the bottom of the closure buckle and a cross member, as would be necessary with other embodiments of the invention.

Furthermore, the retaining lugs provide a tenuous fixing of the free end portion of the strap, by their frictional engagement with the strap, which is advantageous when the strap is being brought to its clamping position, prior to the turning over of the flap and the final locking of the clamp.

In order that the invention may be better understood, two forms of band clamp embodying the invention will now be described with reference to the accompanying drawings, in which:

FIG. 3 is a section through the buckle on the line III—III of FIG. 5;

FIG. 4 is a section of the same buckle in the locking position of the flap;

FIG. 5 is a view of the said toothed band clamp when flat;

Figure 1:
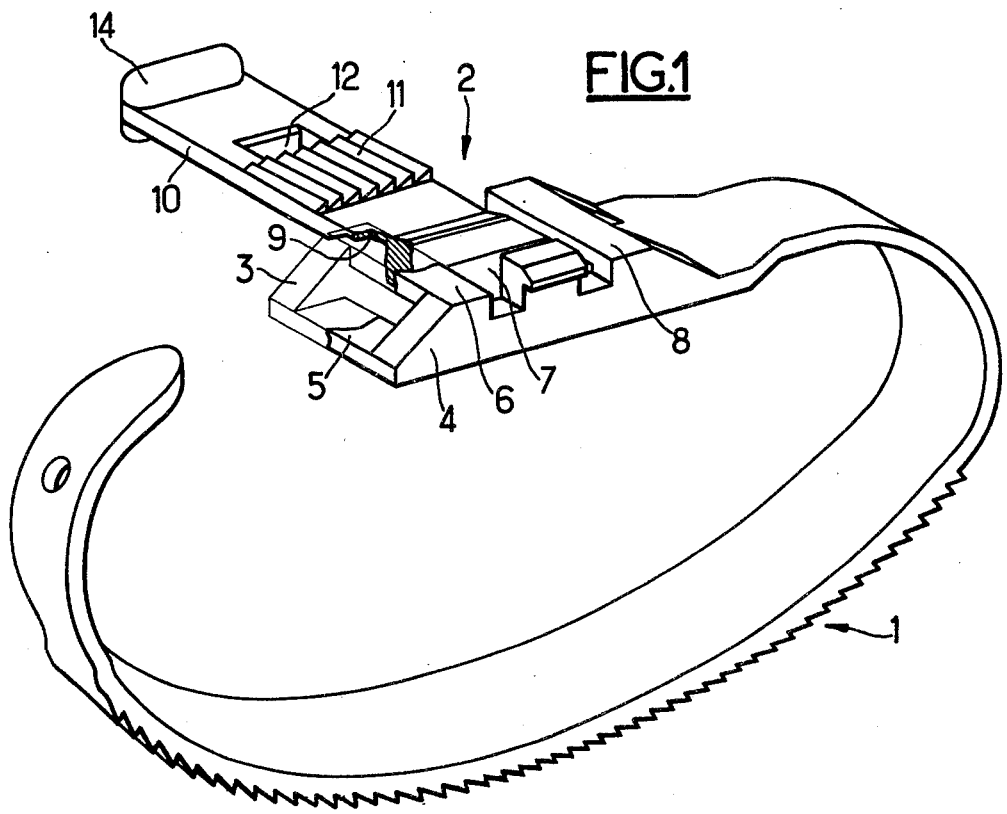
FIG. 1 is a view in perspective of the said toothed band clamp, partially broken away at the level of the buckle of this band clamp to show the arrangement of the flap and the reduced-thickness portion of this flap, forming a hinge.

FIG. 1 shows the toothed band clamp 1, at one end of which is the buckle 2. This buckle comprises two lateral cheeks 3 and 4, of which the broken-away portion is shown in thin lines. These two cheeks are interconnected by bars shown respectively at 5, 6, 7 and 8, which perform a spacing and guiding role. One of the cheeks 3 supports a flap 10 through the reduced-section portion 9, which forms a hinge. The flap comprises ratchet teeth 11 and a rectangular opening 12. The other cheek is provided with a retention catch 13 on which the above-mentioned rectangular aperture 12 can be buttoned. The shape 16 of the end of the flap is designed for easy manipulation, either by hand or by any other rudimentary tool, such as a screw driver for example.

Figure 2:
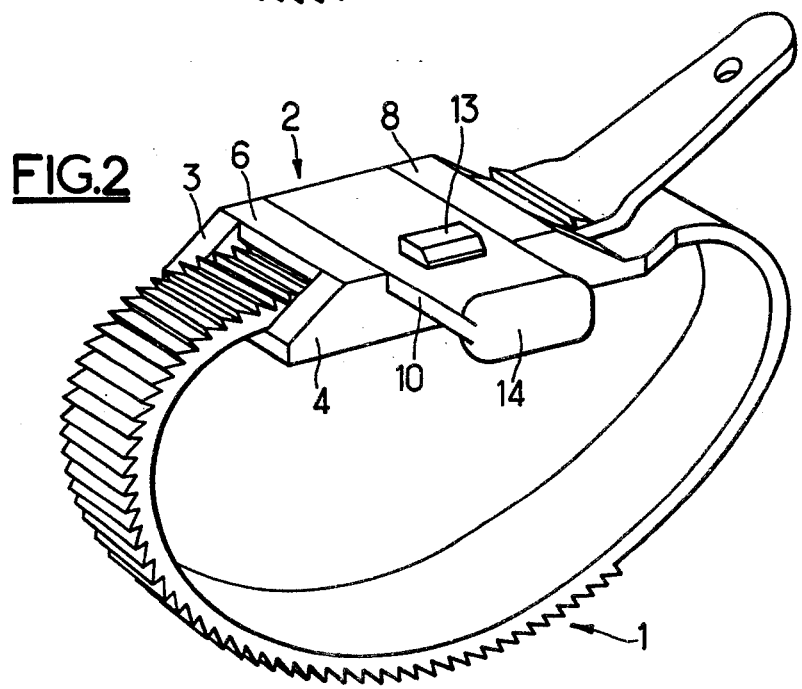
FIG. 2 is a view in perspective of the said closed band clamp, showing the buckle of this band clamp with locked flap.

FIG. 2 shows the band clamp in place after closure of the said flap. FIGS. 3 and 4 show in cross-section the mechanism of this closure and FIG. 5 shows the arrangement of the teeth on the strap and on the flap.

The angle α can vary from nought to a few degrees. In this way, a part of the locking force is used to reinforce the locking of the flap in the direction of the arrow F1 of FIG. 4.

Figure 6:
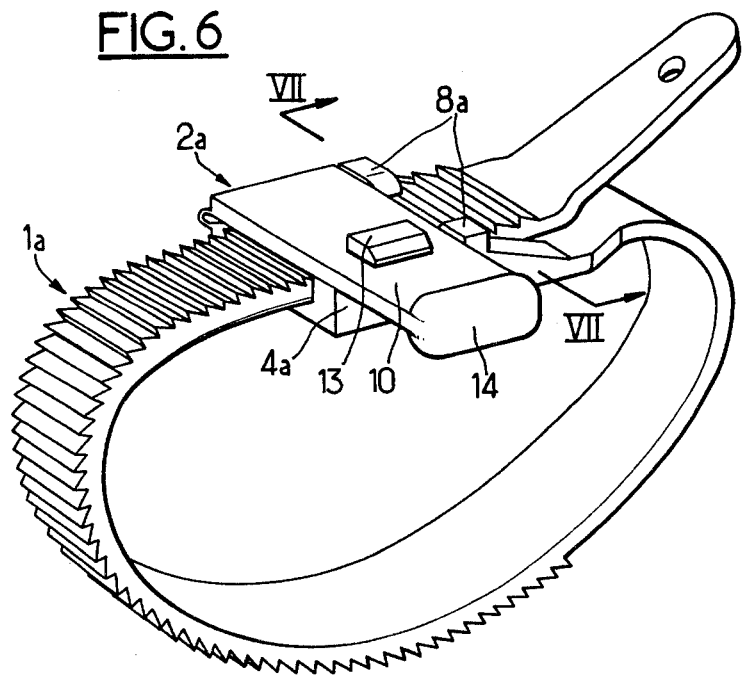
FIG. 6 is a perspective view, similar to FIG. 2, of a band clamp comprising a closure buckle which is truncated at its rear portion and of which the front portion is provided with two symmetrical lugs for the retention of the strap.

The band clamp 1a shown in FIG. 6 differs from that shown in FIG. 2 by its closure buckle 2a, the length of which is slightly reduced. The flap 10 and the retention catch 13, together with the shape of the end 14 of the flap, are the same as those shown in FIG. 2.

However, one of the ends of the lateral cheeks 3a and 4a stops in the plane of the corresponding side wall of the flap 10.

Figure 8:
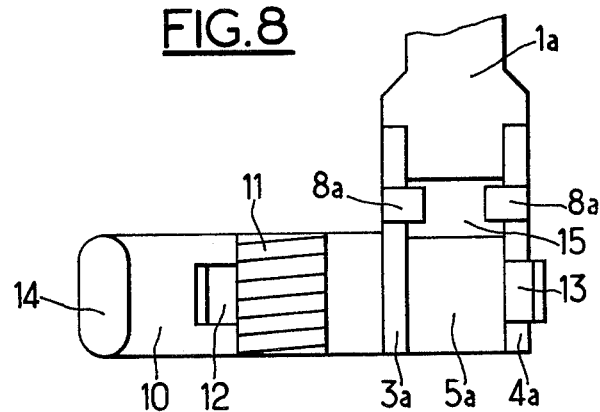
FIG. 8 is a plan view similar to that of FIG. 5.

At the other end of this closure buckle, the cheeks 3a and 4a have, however, the same form as the cheeks 3 and 4 of the forms of band clamp described above, but the cross bar 8 is replaced by two symmetrical lugs 8a, forming retention lugs, and the base portion 5a is separated from the smooth part of the band clamp 1a by an aperture 15 shown in FIG. 8. The cheeks 3a and 4a can be pushed apart at the level of this aperture 15 so as to allow the passage of the toothed portion of the strap 1a between the retention lugs 8a when a pressure is exerted on these lugs by means of this toothed part in a direction perpendicular to the plane of the base 5a, this toothed part then frictionally engaging the inner wall of the said retention lugs.

This frictional engagement, as has been stated above, effects only a tenuous fixing of the toothed part but nevertheless it facilitates the clamping of the strap before the folding over and locking of the flap 10.

Of course, various modifications, improvements or additions can be made on the embodiment which has been described and certain elements can be replaced by equivalent elements without altering the general arrangement of the invention.

In particular, the teeth of the flap and those of the strap may advantageously be given a form such that their steep face is not perpendicular to the smooth face of the said strap but is slightly inclined with respect to this smooth face in the same direction as their face of smaller slope.

This feature is particularly desirable in the case of these band clamps with toothed flaps and especially in combination with the feature that the teeth themselves slope with respect to the transverse direction of the strap.

Figure 7:
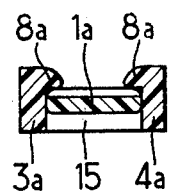
FIG. 7 is a transverse section of the said retention lugs and of the said strap on the line VII—VII of FIG. 6.

It should also be noted in FIGS. 6 and 7 of the accompanying drawings that the smooth side of the strap meets the lateral sides of this strap with a small radius which facilitates the passage of the strap under the lugs 8a, and also reduces the possibility of deterioration of the insulating material of the cables around which the said band clamp is placed, in particular when the insulation of these cables is softened through increase of temperature due to a continuous flow of current in the cables.

Finally, it will be easily understood that from the point of view of putting the band clamp in place, it is advantageous to remove at least the internal sharp edges, to avoid risks of accidents to operators.

It will be evident that the band clamps described and shown are easy to mould in very large numbers, that they are easily releasable and in a single piece, that the cost price can be very competitive with those of non-releasable toothed band clamps, and that the general form of buckle substantially in the plane of the strap enables the appearance of the closed band clamp to be comparable to that of non-releasable band clamps.

I claim:

1. A one-piece releasable band clamp of plastics material comprising:

a strap having generally transversely extending teeth;

a buckle on one end of the strap, a portion of the strap being superimposed on the buckle to form a band;

a flap extending perpendicularly to the length of the strap and attached to said buckle by a flexible portion of reduced cross-section for permitting the flap to be turned back at the portion of reduced cross-section to lie over the superimposed portion of the strap, the flap having teeth which, when the flap has been turned back, extend parallel to and engage the teeth of the superimposed portion of the strap;

and co-operating coupling means on the buckle and the flap, respectively, for locking the flap in its turned-back position and thereby maintaining the engagement of the teeth of the flap and strap, the coupling means comprising a catch projecting from the buckle and means on said flap defining an aperture in a position such that the catch passes through the aperture for locking the flap in its turned-back position.

2. A band clamp as defined in claim 1, in which the teeth on said strap and the teeth on said flap are somewhat sloped with respect to the transverse direction of said strap, whereby the force exerted by the co-operation between the teeth on said strap and said flap tends to reinforce the locking of said flap under said catch undercut.

3. A band clamp as defined in claim 1, in which the catch is undercut on its side remote from the flexible portion of the flap and positioned relative to the aperture when the flap is turned back such that the undercut portion of the catch overlies a portion of the flap adjacent the aperture whereby the flap is securely locked in its turned-back position but, upon relatively moving the flap out from under the undercut portion of the catch, the catch releases the flap.

4. A band clamp as defined in claim 3 in which at least one of the upper edge of the catch remote from the flexible portion of the flap and the corresponding edge of the aperture is chamfered to facilitate passing the catch through the aperture.

* * * * *

UNITED STATES PATENT AND TRADEMARK OFFICE
CERTIFICATE OF CORRECTION

PATENT NO. : 4,008,512
DATED : February 22, 1977
INVENTOR(S) : Marcel Prodel

It is certified that error appears in the above-identified patent and that said Letters Patent are hereby corrected as shown below:

Column 5, line 1, "2." should be --3.--;

Column 5, line 1, "claim 1," should be --claim 2,--;

Column 5, line 8, "3." should be --2.--; and

Column 6, line 6, "claim 3" should be --claim 1--.

Signed and Sealed this ninth Day of August 1977

[SEAL]

Attest:

RUTH C. MASON
Attesting Officer

C. MARSHALL DANN
Commissioner of Patents and Trademarks